Patented Jan. 9, 1940

2,186,907

UNITED STATES PATENT OFFICE 2,186,907

METHOD OF MAKING A DRIED CITRUS FRUIT FOOD PRODUCT

Glen Overton and Lyle S. Overton, Kalamazoo, Mich.; said Lyle S. Overton assignor to said Glen Overton No Drawing. Application June 19, 1937, Serial No. 149,201

1 Claim. (Cl. 99—2)

This invention relates to a method of making a dried citrus fruit food product, especially suited for animal feed and possibly for human food.

In the preparation of canned fruit juices and dried fruit powders from citrus fruit, as much as 65% of the weight of the original fruit is discarded as waste. This waste includes the rind, cellular tissue and seeds of the fruit and has heretofore been considered of insufficient commercial importance, especially in the case of oranges and grapefruit, to warrant further processing.

We have now found, however, that the waste from citrus fruits, such as oranges and grapefruit, has a comparatively high food value when fed to cattle. We have further found that if such waste is first ground to a paste, screened and dried in thin film form, it can economically be used for animal feed.

It is therefore an important object of this invention to provide a method of making a dried citrus fruit food product especially valuable for animal feed, wherein the waste from the preparation of citrus fruit juices is economically utilized.

It is a further important object of this invention to provide a method of making a dried citrus fruit food product from waste resulting from the extraction of the juices of citrus fruits, in accordance with which the waste is first reduced to a finely divided pulp or paste and then dried in thin film form to produce a dried flaked product.

Other and further important objects of this invention will become apparent from the following description and appended claim.

The starting material used in the method of our invention comprises the waste from the manufacture of canned fruit juices and fruit powders from citrus fruits, more particularly grapefruit. This waste includes the rind, cellular tissues and seeds of the grapefruit. In its form as discharged from fruit juice extraction plants, it is not suitable for animal consumption except for a very short time, but can be preserved by the method now to be described.

According to our method, the citrus fruit waste, including seeds and all, is first ground up into a pulp or paste in a suitable type of grinding mill. For this purpose, a hammer mill has been found most satisfactory. As the waste material is ground up, it is also screened, so that upon discharge from the mill, it is in the form of a thick paste or pulp of finely comminuted particles. The size openings in the screen of the hammer mill should be not more than ¼ inch.

As it leaves the mill, the paste usually has about 85% moisture content. With this moisture content, the paste is very heavy, like mush, and not free-flowing.

The drying of the paste is preferably carried out on a drum drier heated internally by steam, or other suitable means. About 70 to 100 pounds per square inch gauge steam pressure gives a satisfactory drum surface temperature for the drying operation. The paste is fed onto the revolving surface of the drier and mechanically spread thereover, as by means of a spreader roll or the like, into a uniform, thin film of perhaps not over about $\frac{1}{64}$ inch thickness in the wet form. As the drum revolves, the moisture is quickly driven out of the film, so that the drying takes place comparatively rapidly, without any scorching or burning of the paste ingredients. After drying, the moisture content should be less than 10% and preferably between 5 and 8%.

The dry film is scraped or doctored off of the drum surface and thereby broken up into the form of flakes of a thickness of not more than a few thousandths of an inch. In this form, the product can be economically transported for use as a cattle feed. The product can be readily made up into a mush by the addition of water or other liquid, preparatory to feeding it to the stock, but is used by many as a dry feed.

We are aware that numerous details of the process may be varied through a wide range without departing from the principles of this invention, and we, therefore, do not purpose limiting the patent granted hereon otherwise than necessitated by the prior art.

We claim as our invention:

The method of making edible thin flakes from citrus waste without loss of solubles to preserve in the product substantially all of the solids content, including dissolved solids, of the rind, cellular tissues, and seeds of citrus fruit waste, which comprises grinding said waste without substantial loss of water content until a mushlike finely comminuted paste is obtained, screening oversize particles from the paste to obtain a uniform non-free-flowing mass, spreading the screened paste into a thin film on a heated rotating surface, heating said surface to rapidly evaporate moisture from the film without scorching or burning of the paste ingredients, continuing the heating of the film until the moisture content thereof is less than about 10%, and scraping the dried film from the heated surface to obtain thin flakes as described.

GLEN OVERTON.
LYLE S. OVERTON.